(12) United States Patent
Engel

(10) Patent No.: US 9,720,265 B2
(45) Date of Patent: Aug. 1, 2017

(54) MANUFACTURING METHODS TO SHEAR LIQUID CRYSTAL

(71) Applicant: Allen Howard Engel, Auburn, WA (US)

(72) Inventor: Allen Howard Engel, Auburn, WA (US)

( * ) Notice: Subject to any disclaimer, the term of this patent is extended or adjusted under 35 U.S.C. 154(b) by 0 days.

(21) Appl. No.: 14/586,910

(22) Filed: Dec. 30, 2014

(65) Prior Publication Data

US 2016/0187700 A1  Jun. 30, 2016

(51) Int. Cl.
*G02F 1/1333* (2006.01)
*G02F 1/13* (2006.01)
*G02F 1/1334* (2006.01)

(52) U.S. Cl.
CPC .......... *G02F 1/1303* (2013.01); *G02F 1/1333* (2013.01); *G02F 1/1334* (2013.01); *G02F 2001/133354* (2013.01)

(58) Field of Classification Search
CPC ... G02F 1/133608; G02F 2001/133322; G02F 2001/133354; G02F 1/133351; G02F 1/13378; G02F 1/133365; G02F 1/1334; G02F 1/1339

See application file for complete search history.

(56) References Cited

U.S. PATENT DOCUMENTS

| | | | | |
|---|---|---|---|---|
| 5,674,576 A | * | 10/1997 | Gotoh | C09K 19/32 252/299.01 |
| 2009/0073351 A1 | * | 3/2009 | Kakinuma | G02F 1/1334 349/89 |
| 2009/0153756 A1 | * | 6/2009 | Roberts | C09K 19/408 349/35 |
| 2012/0113371 A1 | * | 5/2012 | Sohn | G02F 1/133788 349/124 |
| 2014/0125898 A1 | * | 5/2014 | Chao | F21K 9/50 349/34 |

* cited by examiner

*Primary Examiner* — Nathanael R Briggs

(57) ABSTRACT

As a liquid crystal display is assembled, the compressive force of a member or multiple members shears the liquid crystal layer, causing the liquid crystal layer to assume a more uniform, more ordered texture. This novel shearing, coupled with optimal temperature, optimal forms of electromagnetic radiation, and novel combinations of materials synergistically produces a display that is driven at less than 6 volts.

12 Claims, 3 Drawing Sheets

MANUFACTURING METHODS TO SHEAR LIQUID CRYSTAL

BACKGROUND

Prior Art

When testing the voltage characteristics of a polymer dispersed liquid crystal display (pdlc), it is common to report the T90 voltage of the polymer dispersed liquid crystal display. T90 voltage is the voltage required to achieve 90% transparency of a polymer dispersed liquid crystal optical display.

Prior art, patents, and scientific literature report the T90 voltage amounts of pdlc displays. According to the published work of prior workers, the lowest reported T90 voltages for pdlc displays is about 6.0 volts. Typically the T90 voltages are much higher. Often the T90 voltages of PDLC exceed 40 volts.

6 volts is about 200% to 400% higher than the normal operating voltage parameters for commodity lcd mcu driver chips. The high operating voltage of PDLC is one of the reasons why PDLC has been used mostly for privacy windows.

PDLC workers have experimented with controlling the ambient air temperature surrounding the pdlc device during exposure to ultraviolet light, and the temperature of the pdlc mixture, and the temperature of the entire pdlc device during exposure to ultraviolet light. Few workers have reported a voltage below 6 volts.

PDLC workers have experimented with electrically annealing the pdlc display during exposure to ultraviolet radiation. Few workers have reported a voltage below 6 volts.

PDLC workers have experimented with adding fluorinated acrylate resins to the pdlc mixture. Few have reported a voltage below 6 volts.

Liquid crystal workers have experimented with a variety of shearing techniques to optimize displays.

To align lyotropic liquid crystals, it is known in the art to coat the lyotropic mixture onto the bottom substrate, and then directly contact the lyotropic mixture with a doctor blade to shear the lyotropic mixture. Then the top substrate is attached to the bottom substrate.

It is also known in the art to shear liquid crystal which is dispensed between 2 rigid substrates. The rigid substrates that comprise the the liquid crystal cell are pulled in opposite directions, which causes a shearing force on the liquid crystal layer. However, the above process can only be scaled up to a batch process, not a continuous process.

To shear ferroelectric displays, it is known in the art to gently shear the display laminate around rubber rollers. As the films comprising the laminate are handled around a round roller, the respective justaposed display substrates are stretched at different speeds, shearing the ferroelectric mixture distributed between the two substrates. The shear force exerted on the ferroelectric layer by the films having different stretching speeds is relatively small, not comparable to the shearing force of a doctor blade on a liquid crystal layer.

"There are mainly three types of mechanical deformation applied to the liquid crystal/polymer composites: (1) shear deformation; (2) stretch deformation; and (3) compress deformation."

Prior art methods have demonstrated that shear force can produce alignment to liquid crystal droplets inside PDLCs and improve response speed. Further, some other references find that sheared PDLC samples of high liquid crystal concentration (.about. 80 wt %) exhibit large birefringence due to the uniform alignment of liquid crystals induced by shear force. Other groups have used shear stress during the phase separation process to align liquid crystals in many liquid crystal polymer composite systems. For instance, build sheared polymer dispersed nematic liquid crystals (PDNLC) and sheared polymer dispersed cholesteric liquid crystals (PDCLC) and demonstrate the elliptical shape of liquid crystal droplets formed by the shear using scanning electron microscopy. The characterized electro-optical performance of the PDNLC is consistent with the theoretical prediction. Sheared PDCLC shows a correlation between ellipticity and reflectivity: larger ellipticity produces blue-shifted and narrower reflection band. Prealignment for ferroelectric liquid crystals can be achieved inside a polymer matrix by applying shear force during polymerization, avoiding the difficulty of building surface stabilized ferroelectric liquid crystal devices of which the cell gap is usually thinner than 2 .mu.m."

In general, liquid crystal displays are manufactured using batch processes. Batch processes are usually slower than continuous, roll to roll manufacturing processes.

Currently polymer dispersed liquid crystal displays are driven by electronic circuits which have higher voltages than many twisted nematic displays or super twisted nematic displays.

Advantages

Accordingly several advantages of one or more aspects are as follows: the synergism of the manufacturing techniques optimizes the morphology of the polymer dispersed liquid crystal mixture so that the mixture has a T90 of 6 volts or less, and so can be driven by commodity grade semiconductors, and the substrates and the chemicals thereinbetween can be laminated with roll to roll equipment, continuously, at production speeds much faster than batch processes.

Other advantages of one or more aspects will be apparent from a consideration of the drawings and ensuing description.

DRAWINGS—FIGS. 1-3

DETAILED DESCRIPTION—FIGS. 1-3

Figure 1:
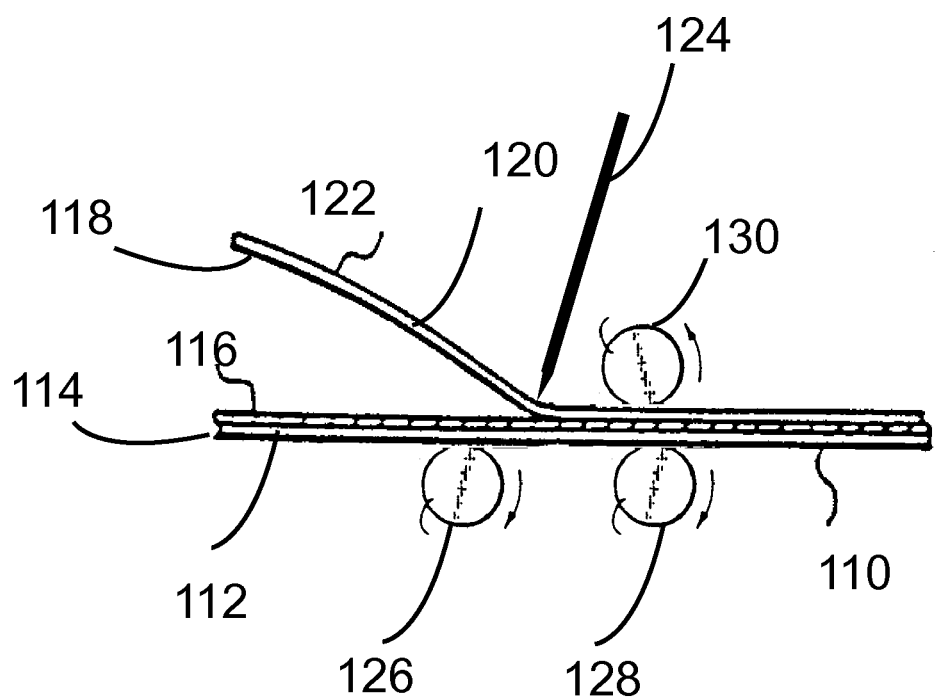
FIG. 1 shows a single doctor blade which laminates and/or shears the liquid crystal display

Referring to FIG. 1, roller 126 and roller 128 support the bottom surface 110 of plastic film or continuous web or plastic film sheet or metalized film or bottom substrate 112. Liquid crystal layer 116 is deposited or printed or coated or jetted or cast onto the top surface 114 of bottom substrate 112. Bottom surface 118 of plastic film or continuous web or plastic film sheet or metalized film or top substrate 120 is in contact with liquid crystal layer 116. Doctor blade or ductor blade 124 is in contact with the top surface 122 of the top substrate 120. The doctor blade 124 compresses the top substrate 120, causing the liquid crystal layer 116 to shear. Roller 130 contacts the top surface 122 of the top substrate 120. Roller 130 is in vertical alignment with roller 128.

Figure 2:
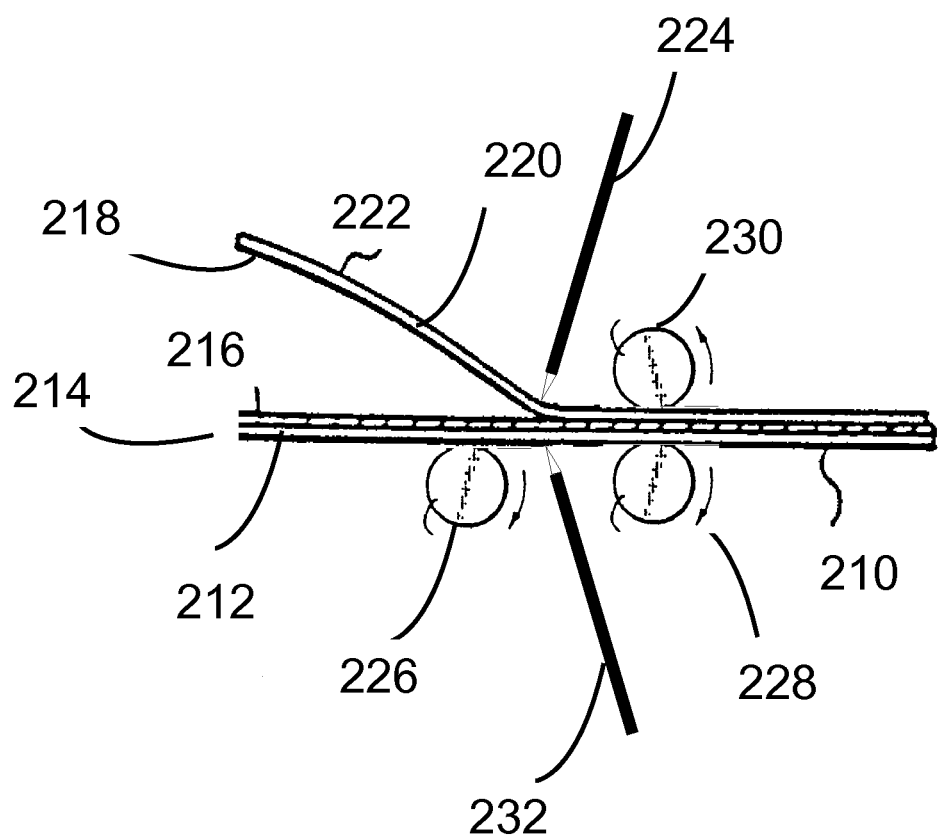
FIG. 2 shows two doctor blades which laminate and/or shear the liquid crystal display.

Referring to FIG. 2, roller 226 and roller 228 support the bottom surface 210 of plastic film or continuous web or plastic film sheet or metalized film or bottom substrate 212. Liquid crystal layer 216 is deposited or printed or coated or jetted or cast onto the top surface 214 of bottom substrate 212. Bottom surface 218 of plastic film or continuous web or plastic film sheet or metalized film or top substrate 220 is in contact with liquid crystal layer 216. Doctor blade or ductor blade 224 is in contact with the top surface 222 of the top substrate 220. Doctor blade or ductor blade 232 is in contact with the bottom surface 210 of the bottom substrate 212. Doctor blade 224 is in vertical alignment with doctor blade 232. Doctor blade 224 compresses the top substrate 220, while doctor blade 232 simultaneously compresses the bottom substrate 214, causing the liquid crystal layer 216 to shear. Roller 230 contacts the top surface 222 of the top substrate 220. Roller 230 is in vertical alignment with roller 228.

Figure 3:
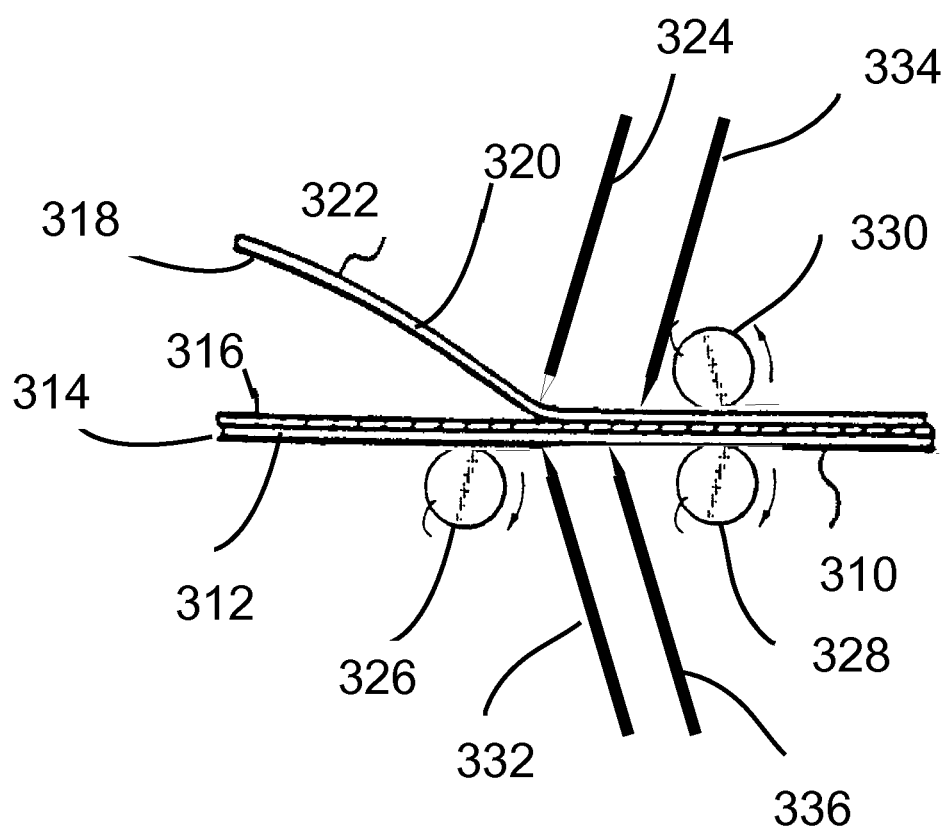
FIG. 3 shows two sets of two doctor blades which laminate and/or shear the liquid crystal display

Referring to FIG. 3, roller 326 and roller 328 support the bottom surface 310 of plastic film or continuous web or plastic film sheet or metalized film or bottom substrate 312. Liquid crystal layer 316 is deposited or printed or coated or jetted or cast onto the top surface 314 of bottom substrate 312. Bottom surface 318 of plastic film or continuous web or plastic film sheet or metalized film or top substrate 320 is in contact with liquid crystal layer 316. Doctor blade or ductor blade 324 is in contact with the top surface 322 of the top substrate 320. Doctor blade or ductor blade 332 is in contact with the bottom surface 310 of the bottom substrate 312. Doctor blade 324 is in vertical alignment with doctor blade 332. Doctor blade 324 compresses the top substrate 320, while doctor blade 332 simultaneously compresses the bottom substrate 312, causing the liquid crystal layer 316 to shear. Doctor blade or ductor blade 334 is in contact with the top surface 322 of the top substrate 320. Doctor blade or ductor blade 336 is in contact with the bottom surface 310 of bottom substrate 312. Doctor blade 334 is not in vertical alignment with doctor blade 336. Doctor blade 334 compresses top substrate 320, while doctor blade 336 simultaneously compresses bottom substrate 312, causing the liquid crystal layer 316 to shear. Roller 330 contacts the top surface 322 of the top substrate 320. Roller 330 is in vertical alignment with roller 328.

Some embodiments provide a method of producing a liquid crystal optical device, which methods comprise, in sequence, providing a layer of a liquid crystal composition on the electrode layer of a substrate carrying electrode layer, laminating and shearing an opposite substrate carrying electrode layer on the substrate carrying electrode layer which has been provided, on its electrode layer, with the layer of the liquid crystal composition, so that the layer of the liquid crystal composition lies between the electrode layers, to obtain a liquid crystal optical device yet to be laminated and sheared, laminating and shearing the liquid crystal composition enclosed in the liquid crystal optical device yet to be laminated and sheared.

Other embodiments provide a method of producing a liquid crystal optical device, which methods comprise, in sequence, providing a layer of a liquid crystal composition comprising a polymer dispersed liquid crystal material and a resin having crosslinking ability on the electrode layer of a substrate carrying electrode layer, laminating and shearing an opposite substrate carrying electrode layer on the substrate carrying electrode layer which has been provided, on its electrode layer, with the layer of the polymer dispersed liquid crystal composition, so that the layer of the polymer dispersed liquid crystal composition lies between the electrode layers, to obtain a liquid crystal optical device yet to be laminated and sheared, laminating and shearing the polymer dispersed liquid crystal composition enclosed in the liquid crystal optical device yet to be oriented, and crosslinking the resin having crosslinking ability enclosed in the oriented liquid crystal optical device.

Other embodiments employ a method continuous and high-speed mass production method wherein a layer of a polymer dispersed liquid crystal composition is formed by continuously applying the composition on a flexible plastic substrate bearing substrate by using the above-described application technique or the like, during moving the substrate at a high speed and then, an opposite plastic substrate carrying electrode layer is layered on the layer of the liquid crystal composition and continuously laminated and sheared.

The orienting treatment is continued past the nips of the laminating and shearing devices. Orienting is maintained by thermal annealing and electrical annealing after formation of film and lamination and shearing.

Another embodiment comprises a method of orienting the polymer dispensed liquid crystal composition of the present invention is to orient the polymer dispersed liquid crystals in a liquid crystal optical device produced as described above by subjecting the liquid crystal optical device yet to be oriented to a shearing treatment by a doctor blade or other tool.

The PDLC laminate is handled around 1 or more doctor blades. Preferably the PDLC laminate is handled by at least 2 doctor blades. Each doctor blade compresses the outside surface of one of the substrate films, causing the PDLC mixture deposited therein to also compress. As the film moves past the doctor blade nip, the PDCL then decompresses. The compression and decompression forces shear the PDLC mixture, forming the liquid crystal mixture into a uniform texture.

As said PDLC laminate has been handled by one doctor blade, it can also be simultaneously handled by another doctor blade, or by another doctor blade downstream of the first doctor blade. The opposite doctor Blade affects the outside surface of the substrate which previously was not contacted by a doctor blade. This opposite doctor blade compresses the outside surface of one of the opposite substrate film, causing the PDLC mixture deposited therein to also compress. As the film moves past the doctor blade nip, the PDLC then decompresses. The compression and decompression forces shear the PDLC mixture, further forming the liquid crystal mixture into a uniform texture.

In some embodiments, in order to attain a uniform orientation in the whole liquid crystal cell, the shearing treatment is conducted during the continuous moving of the web past the doctor blades.

In some embodiments, the above-described orientation by shearing treatment can be conducted by using various kinds of apparatuses and systems, such as rollers, bristles, felt pads, doctor blades, and others.

In still other embodiments, orientation of liquid crystals by means of the above-described shearing treatment can be performed more effectively and more efficiently by subjecting a liquid crystal optical device to the shearing treatment in the course of continuous movement of the liquid crystal optical device. Particularly, it can be performed furthermore effectively at a speed equal to the UV curing speed of the pdlc laminate as it is cured past several uv sources, enabling mass production, by continuously moving and handling the liquid crystal optical device past multiple doctor blades that shear the liquid crystal.

The moving speed of the liquid crystal optical device during the shearing treatment cannot be uniformly defined because it varies depending on the speed of the pdlc laminate as it is cured by multiple uv sources, the ambient temperature, the kinds of the liquid crystals used, etc. It is generally sufficient to adjust the speed to the line speed of a continuous production process. Therefore, it is possible to equalize all of the line speeds in various steps including the orientation step by shearing treatment, whereby a continuous, high-speed process for mass producing liquid crystal optical devices can be efficiently realized, resulting in an extreme improvement of mass productivity.

We have discovered a synergism between the following pdlc manufacturing techniques: the ambient temperature of curing, the temperature of the pdlc mixture and that of the device itself, the electrical annealing, the duration and intensity of the ultraviolet light exposure, the addition of fluorinated acrylates, and shearing around multiple doctor blades. This synergism fabricates a pdlc display with a T90 under 4.5 volts.

Here is a simplified description of one embodiment of the manufacturing steps:

The pdlc liquid crystal mixture is disposed between the polymer film substrates, and the substrates are adhered together to form a laminate, Before curing the polymer dispersed liquid crystal mixture, the pdlc film laminate comes into contact with one to several doctor blades. If multiple doctor blades are used, it may be efficient to position the doctor blades opposite each other on alternating sides of the film laminate. As the film laminate comes into abrupt contact with the sharp edge of the doctor blade, the film is dramatically and significantly compressed. The abrupt compressive force of the doctor blade, followed by the relaxing of the pdlc mixture, shears and orients the liquid crystal mixture. The shearing causes a uniform polymer dispersed order, which remains uniform as the pdlc mixture is cured by ultraviolet light.

Tools effective at laminating and shearing the display are doctor blade or blades, or rollers, or a myriad of hairs, or a myriad of fibers, or a myriad of filaments, or wipers. These devices gently bring the two substrates together.

The pdlc film laminate is cured by ultraviolet light, within a specific temperature range to optimize the morphology of the polymer dispersed liquid crystal mixture.

The pdlc mixture is affected by an AC electrical wave of about 100 Hz, and a voltage of about 20 volts.

Common liquid crystal mixtures are polymer dispersed liquid crystals, guest host liquid crystal mixtures, nematic liquid crystals, ferroelectric liquid crystals, super twisted nematic liquid crystals, and cholesteric liquid crystal mixtures.

It is known that free radical polymers polymerize when affected by radiation like ultraviolet radiation, electron beam radiation, laser radiation, near-visible radiation, or visible light radiation.

Kim et al. teaches "Addition of fluorinated monomer gave long saturation time, increased off state diffraction efficiency, small anchoring strength and driving voltage." Some of the embodiments comprise
2-(perfluoroalkyl)ethyl methacrylate (PFEMA), 2,2,2-trifluoroethyl methacrylate (TFEMA), and 2,2,2-trifluoroethyl acrylate (TFEA).

This shearing action discussed above, in syngergism with the curing techniques discussed above, fabricates a pdlc display with T90 under 4.5 volts.

What is claimed is:

1. A method for continuously manufacturing and ordering a liquid crystal optical device the method comprising:
providing two flexible substrates that are parallel to each other,
said flexible substrates having surfaces facing each other on which are disposed respective electrode layers,
one substrate supports a layer of a liquid crystal layer having characteristics of an isotropic order,
bringing said substrates together into a nip, combining within said nip said substrates into a laminate,
further handling the laminate by a member with a means to exert a predetermined compressive force upon said laminate, by contacting the exterior surfaces of said laminate, so that said liquid crystal layer deposited within said laminate is sheared and thereby responds to the shearing force transforming the liquid crystal layer having characteristics of an anisotropic order wherein the liquid crystal layer is sheared uniformly by continuously moving the means exerting compression on the liquid crystal layer,
polymerizing resins within said liquid crystal layer with electromagnetic radiation, and
cutting said laminate into a plurality of separate liquid crystal displays.

2. The method of claim 1, wherein the electromagnetic radiation is selected from the group comprising ultraviolet radiation, electron beam radiation, laser radiation, near-visible radiation, or visible light radiation.

3. The method of claim 1, wherein composition for liquid crystal layer is selected from the group comprising polymer dispersed liquid crystal mixtures, guest host liquid crystal mixtures, nematic liquid crystals, ferroelectric liquid crystals, super twisted nematic liquid crystals, and cholesteric liquid crystal mixtures.

4. The method of claim 1, wherein shearing of the liquid crystal layer is performed by a member selected from the group of doctor blades, doctor rollers, brush fibers, filaments, or wipers.

5. The method of claim 1, wherein the polymerization of the resin in the liquid crystal layer is performed at a predetermined temperature range.

6. The method of claim 1, wherein the polymerization of the liquid crystal layer occurs simultaneously as electrodes in the liquid crystal layer are energized with an alternating current of a predetermined voltage value and voltage frequency.

7. The method of claim 6, wherein the liquid crystal layer, when energized, achieves a transparency of 90% at less than 10 volts.

8. The method of claim 1 wherein the resin comprises at least one kind of flourinated acrylate.

9. The method of claim 1, wherein composition of the liquid crystal layer comprises fluorinated acrylate selected from group comprising 2-(perfluoroalkyl)ethyl methacrylate (PFEMA), 2,2,2-trifluoroethyl methacrylate (TFEMA), or 2,2,2-trifluoroethyl acrylate (TFEA).

10. A method for continuously manufacturing and ordering a liquid crystal device, the method comprising:
providing two flexible substrates that are parallel to each other, said flexible substrates have surfaces facing each other on which are disposed respective electrode layers,
patterning a polymer mixture onto to one or both surfaces of the said flexible substrates, said polymer mixture having a means to adhere one substrate to the other substrate,
coating one substrate with a layer of a liquid crystal composition,
bringing said substrates together in a nip, combining said nip said substrates into a laminate, further handling said laminate by a member with a shearing means, said shearing means exerts a predetermined compressive force upon said laminate for a predetermined duration, by applying said compressive force uniformly by moving upon the exterior surfaces of said laminate, thereby compressing said liquid crystal layer, wherein the shearing means terminates the compressive force so that said liquid crystal layer relaxes in the absence of said compressive force, and said liquid crystal layer relaxes to assume a regular crystalline order, and cutting said laminate into a plurality of separate liquid crystal displays.

11. The method of claim 10, wherein said polymer mixture is exposed to energy selected from the group of heat energy, ultrasonic energy, or radio frequency energy, whereby said polymer mixture adheres one substrate to the other substrate.

12. The method of claim 10, wherein said liquid crystal layer is selected from the group comprising polymer dispersed liquid crystal mixtures, guest host liquid crystal mixtures, neurotic liquid crystals, ferroelectric liquid crystals, super twisted nematic liquid crystals, and cholesteric liquid crystal mixtures.

* * * * *